No. 638,343. Patented Dec. 5, 1899.
E. G. LATTA.
VELOCIPEDE.
(Application filed Mar. 18, 1895.)
(No Model.)
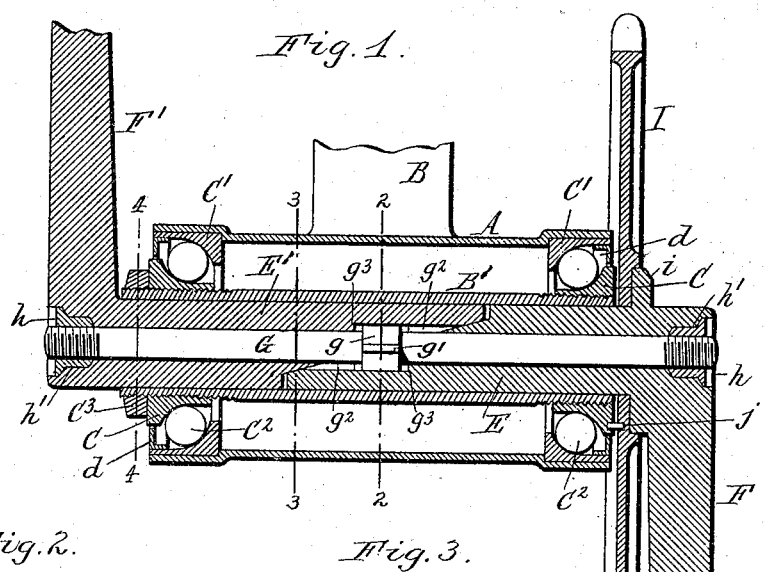
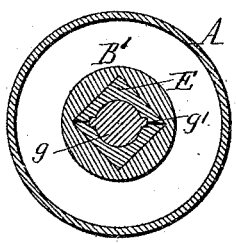
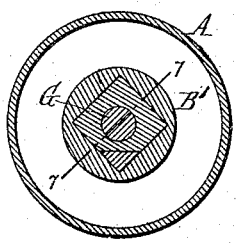
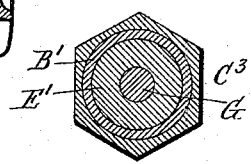
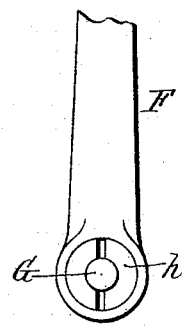
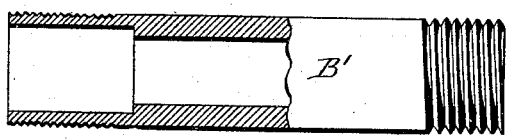
WITNESSES:
Chas. F. Burkhardt
Henry L. Deck
Emmit G. Latta INVENTOR.
By Wilhelm H. Bonner
ATTORNEYS.
THE NORRIS PETERS CO., PHOTO-LITHO., WASHINGTON, D. C.

UNITED STATES PATENT OFFICE.

EMMIT G. LATTA, OF FRIENDSHIP, NEW YORK, ASSIGNOR TO THE POPE MANUFACTURING COMPANY, OF PORTLAND, MAINE.

VELOCIPEDE.

SPECIFICATION forming part of Letters Patent No. 638,343, dated December 5, 1899.

Application filed March 18, 1895. Serial No. 542,130. (No model.)

*To all whom it may concern:*

Be it known that I, EMMIT G. LATTA, a citizen of the United States, residing at Friendship, in the county of Allegany and State of New York, have invented a new and useful Improvement in Velocipedes, of which the following is a specification.

This invention relates to that class of crank-shafts and cranks for velocipedes in which the crank-shaft is composed of two parts or sections, each of which carries one of the cranks.

My invention has for its objects to apply the crank-shaft to a closed crank-shaft bracket without the use of projecting keys or similar fastenings and in such a manner that its parts can be easily removed and replaced without disturbing the ball-bearings and without requiring the crank-shaft bracket to be perforated for the admission of tools; to increase the strength of the shaft, so as to prevent bending or twisting thereof, and thereby reliably retain the bearings in alinement; to so construct the sectional crank-shaft that it may be reversed in the bracket to locate the sprocket or power-transmitting wheel on the opposite side of the machine for equalizing the wear on the teeth of the wheel, and so that the parts of the crank-shaft are not required to be made rights and lefts.

In the accompanying drawings, Figure 1 is a sectional elevation of the crank-shaft and its supporting-bracket, showing the parts in their operative position. Figs. 2, 3, and 4 are cross-sections in lines 2 2, 3 3, and 4 4, Fig. 1, respectively. Fig. 5 is a detached side elevation of one part of the sectional crank-shaft and the corresponding crank. Fig. 6 is an end view of one of the cranks, showing the screw-nut on the end of the tie-bolt. Fig. 7 is a detached view of the journal-sleeve of the crank-shaft, a portion of the sleeve being shown in longitudinal section, the plane of which is in line 7 7, Fig. 3.

Like letters of reference refer to like parts in the several figures.

A is the crank-shaft bracket, which may be of the usual tubular form and which is rigidly secured to a member B of the velocipede-frame by any ordinary means.

B' is a rotary journal-sleeve supported within the crank-shaft bracket, preferably by ball-bearings arranged at the ends of the sleeve. These ball-bearings may be of any suitable or well-known construction. In the construction shown in Fig. 1 each bearing consists of an internally-screw-threaded bearing ring or cone C, applied to an external screw-thread formed on the adjacent end of the sleeve, a surrounding bearing cone or cap C', secured in the enlarged end portion of the tubular bracket, and a row of balls $C^2$, interposed between the bearing-cones. A check-nut $C^3$ is applied to the projecting portion of the sleeve, and the spaces between the outer edges of the cones are closed by annular dust-caps $d$.

E E' represent the two parts of the sectional crank-shaft, and F F' the cranks, each of which is formed integrally with or permanently secured to the outer end of the adjacent crank-shaft section. These sections are interlocked with the journal-sleeve in such a manner as to compel the sleeve to turn with the crank-shaft and at the same time permit the shaft-sections to be moved lengthwise in the sleeve for inserting and removing the same.

In the construction shown in the drawings the central portion of the bore of the journal-sleeve is square or flat-sided, as shown in Figs. 2 and 3, while the end portions of its bore may be round, as shown in Fig. 4, and the crank-shaft sections are correspondingly rectangular at their inner portions and round at their outer portions, whereby the sleeve is caused to turn with the crank-shaft. The inner portions of the crank-shaft sections preferably overlap each other, and their contiguous faces are chamfered or inclined at an angle to the axis of the crank-shaft, as shown.

G is a tie-bolt whereby the crank-shaft sections are firmly secured together and retained in the journal-sleeve. This bolt passes through openings formed axially in the crank-shaft sections and is provided at its ends with screw-nuts $h$, which engage with the external screw-threads of the bolt and which are preferably countersunk in recesses $h'$, formed in the outer ends of the crank-shaft sections, as shown in Figs. 1 and 6, so as to render the faces of the nuts flush with the ends of the shaft-sections. The tie-bolt is provided on its central portion with a collar or enlargement $g$, having projecting longitudinal ribs or wings $g'$ on opposite sides thereof, which enter longitudinal grooves formed in the contiguous faces of the crank-shaft sections, as shown in Fig. 2, whereby the tie-bolt is prevented from turning in said sections in tightening the clamping-nuts. The overlapping portions of these sections are formed with longitudinal grooves or recesses $g^2$, which receive the collar of the tie-bolt and which form shoulders $g^3$ on opposite sides of said collar. These recesses extend to the beveled faces of the shaft-sections, as shown in Fig. 1.

I is the usual sprocket-wheel whereby power is transmitted from the crank-shaft to the driving-wheel of the velocipede in a well-known manner. In the construction shown in the drawings this wheel is secured, preferably by brazing, to a flange $i$, arranged on one of the shaft-sections; but it may be secured to the shaft by any other suitable means. With the exception of the flange $i$ on one part of the crank-shaft both parts are constructed alike for economy in manufacture.

$j$ is a pin or projection which is arranged on that bearing-cone of the journal-sleeve facing the sprocket-wheel and which enters an opening formed in the inner side of the web of the sprocket-wheel, as shown in Fig. 1, whereby said cone is held against turning on the sleeve when the parts are in position.

In assembling the parts the journal-sleeve, with the bearing-cone C, balls $C^2$, and check-nut $C^3$, is first placed in position in the crank-shaft bracket. The crank-shaft section carrying the sprocket-wheel is then inserted in the journal-sleeve, care being taken to turn the adjacent bearing-cone so that its pin $j$ enters the opening in the sprocket-wheel. The tie-bolt G, with its screw-nuts removed, is next passed through the axial opening of the inserted crank-shaft section from the left-hand side of the bracket. The other shaft-section is then passed over the tie-bolt and into the journal-sleeve, and the clamping-nuts are then applied to the tie-bolt and tightened, thereby firmly drawing the shaft-sections together and causing the chamfered overlapping portions of the shaft-sections to wedge each other outwardly against the surrounding journal-sleeve. If desired, the tie-bolt may be passed through the hollow crank-shaft section E' before inserting the latter in the journal-sleeve. Any slight looseness between the flat-sided portion of the crank-shaft and the journal-sleeve is readily taken up by simply forcing the shaft-sections farther into the sleeve by means of the clamping-nuts of the tie-bolt. Should it be desired to remove either of the cranks, the clamping-nut at the opposite end of the tie-bolt G is removed and the bolt is used as a drift for driving the crank-shaft section out of the journal-sleeve, the collar of the bolt displacing said shaft-section by striking against its shoulder $g^3$.

Either or both parts of the shaft can be removed in this manner and again replaced without disturbing the ball-bearings. The journal-sleeve, with the sectional crank-shaft and the tie-bolt, forms a compound shaft possessing greater strength and rigidity than the usual solid crank-shaft, and it is therefore less liable to bend or twist, thus reliably maintaining the bearings in alinement. While the journal-sleeve increases the weight of the shaft, it enables the usual crank-bosses and cross-keys to be dispensed with, rendering the total weight but little, if any, greater than that of the usual construction.

My improved construction has the further advantages that it is free from projecting parts and is compact and neat in appearance. It also possesses the advantage of enabling the parts of the crank-shaft to be reversed in the crank-shaft bracket for locating the sprocket-wheel on either side of the bracket, which is desirable for bringing the unworn sides of the sprockets into operative position when their working sides or faces become worn. This construction has the further advantage that it does not require the use of a tool or other device for holding the journal-sleeve against turning in removing the crank-shaft sections, and no opening is therefore required in the bracket for the passage of such a tool, thus retaining the oil and effectually excluding dirt and water therefrom. As the two parts of the crank-shaft are similar and their seats in the journal-sleeve are alike, they can be used interchangeably and need not be made rights and lefts.

I claim as my invention—

1. The combination with a crank-shaft bracket and a sleeve journaled therein, of a crank-shaft arranged in said sleeve and composed of sections each carrying a crank, and a tie-bolt connecting said shaft-sections and provided on its central portion with a collar or shoulder adapted to engage against the adjacent ends of the shaft-sections and at both ends with screw-nuts whereby the shaft-sections are forced into said journal-sleeve, substantially as set forth.

2. The combination with a crank-shaft composed of sections having chamfered overlapping ends, the chamfered face of each shaft-section having a recess forming a shoulder and each section having a crank, of a sleeve surrounding the overlapped shaft-sections, and a tie-bolt extending through said shaft-sections and having a collar or enlargement adapted to engage against the shoulders of the crank-shaft sections, substantially as set forth.

Witness my hand this 7th day of March, 1895.

EMMIT G. LATTA.

Witnesses:
E. A. HEWITT,
W. A. STEVENS.